United States Patent
Hucker et al.

(10) Patent No.: US 8,796,553 B2
(45) Date of Patent: Aug. 5, 2014

(54) ELECTRICAL CIRCUIT ASSEMBLIES AND STRUCTURAL COMPONENTS INCORPORATING SAME

(75) Inventors: Martyn John Hucker, Bristol (GB); Sajad Haq, Glasgow (GB); Michael Dunleavy, Bristol (GB); David William Gough, Bristol (GB); Jason Karl Rew, Bristol (GB); Philip Lawrence Webberley, Preston (GB)

(73) Assignee: BAE Systems PLC, London (GB)

( * ) Notice: Subject to any disclaimer, the term of this patent is extended or adjusted under 35 U.S.C. 154(b) by 540 days.

(21) Appl. No.: 13/003,174

(22) PCT Filed: Jul. 7, 2009

(86) PCT No.: PCT/GB2009/050799
§ 371 (c)(1),
(2), (4) Date: Jan. 7, 2011

(87) PCT Pub. No.: WO2010/004323
PCT Pub. Date: Jan. 14, 2010

(65) Prior Publication Data
US 2011/0120750 A1    May 26, 2011

(30) Foreign Application Priority Data
Jul. 8, 2008 (GB) .................................. 0812483.6

(51) Int. Cl.
*H01B 5/00* (2006.01)
*B05D 5/12* (2006.01)
*C25D 5/02* (2006.01)
*C25D 7/06* (2006.01)

(52) U.S. Cl.
USPC .......................... 174/126.2; 205/122; 427/105

(58) Field of Classification Search
USPC ........................................................ 174/126.2
See application file for complete search history.

(56) References Cited

U.S. PATENT DOCUMENTS 3,331,758 A * 7/1967 Levine ........................... 205/112
5,372,133 A   12/1994 Hogen Esch (Continued)

FOREIGN PATENT DOCUMENTS

DE    102004042423    3/2006
GB       2180940 A    4/1987

(Continued)

OTHER PUBLICATIONS

Notification of Transmittal of the International Search Report (Forms PCT/ISA/220 and PCT/ISA/210) and the Written Opinion of the international Searching Authority (Form PCT/ISA/237) issued on Oct. 6, 2009, in the corresponding International Application No. PCT/GB2009/050799.

(Continued)

*Primary Examiner* — William H Mayo, III
*Assistant Examiner* — Hiram E Gonzalez
(74) *Attorney, Agent, or Firm* — Buchanan Ingersoll & Rooney P.C.

(57) ABSTRACT

Composite structural components are disclosed that include electrically conducting fibers providing multiple signal or paths to electrical components disposed on or adjacent the material. The signal paths may therefore be embedded in the structural component as an intrinsic reinforcing element. Also disclosed are materials for making up the structure and fabrics and methods for the production thereof.

9 Claims, 3 Drawing Sheets

(56) References Cited

U.S. PATENT DOCUMENTS

| | | | |
|---|---|---|---|
| 5,843,567 A * | 12/1998 | Swift et al. | 428/221 |
| 7,018,217 B2 | 3/2006 | Marshall et al. | |
| 7,924,031 B2 | 4/2011 | Watkins, Jr. et al. | |
| 2003/0219059 A1 | 11/2003 | Scott | |
| 2005/0260870 A1 | 11/2005 | Marshall et al. | |
| 2007/0096751 A1 | 5/2007 | Georgeson et al. | |
| 2007/0148345 A1 | 6/2007 | Decams et al. | |
| 2008/0026187 A1 | 1/2008 | Hauer | |
| 2008/0115954 A1 | 5/2008 | Griess | |
| 2009/0121121 A1 * | 5/2009 | Dunleavy et al. | 250/227.14 |
| 2009/0294022 A1 | 12/2009 | Hayes et al. | |
| 2011/0017867 A1 * | 1/2011 | Simmons et al. | 244/1 A |

FOREIGN PATENT DOCUMENTS

| | | |
|---|---|---|
| GB | 2218813 A | 11/1989 |
| GB | 2421952 A | 7/2006 |
| JP | 5-332965 A | 12/1993 |
| WO | WO 2005/114781 | 12/2005 |
| WO | WO 2007/003880 | 1/2007 |
| WO | WO 2007/003883 | 1/2007 |

OTHER PUBLICATIONS

Notification Concerning Transmittal of International Preliminary Report on Patentability (Forms PCT/IB/326 and PCT/IB/373) and the Written Opinion of the Searching Authority ( Form PCT/ISA/237) issued in the corresponding International Application No. PCT/GB2009/050800 dated Jan. 20, 2011.

International Search Report (PCT/ISA/210) issued on Oct. 6, 2009, by European Patent Office as the International Searching Authority for International Application No. PCT/GB2009/050799.

International Search Report (PCT/ISA/210) issued on Oct. 6, 2009, by European Patent Office as the International Searching Authority for International Application No. PCT/GB2009/050800.

Two (2) GB Search Reports dated Jun. 30, 2009 for GB Application No. GB0812483.6.

L. Hou et al., A resistance-based damage location sensor for carbon-fibre composites, Smart Materials and Structures, Institute of Physic's Publishing, 2002, pp. 966-969.

Ruediger Schueler et al., Conductivity of CFRP as a tool for health and usage monitoring, Proceedings of the SPIE vol. 3041, Bellingham, VA, USA, Jan. 1, 1997, pp. 417-426.

Nobuyuki Takeyasu et al., Metal Deposition Deep into Microstructure by Electroless Plating, Japanese Journal of Applied Physics, vol. 44, No. 35, 2005, pp. L1134-L1137.

Office Action issued by the U.S. Patent and Trademark Office in the U.S. Appl. No. 13/003,145, mailed Dec. 31, 2012, U.S. Patent and Trademark Office , Alexandria, VA. (9 pages).

* cited by examiner

ELECTRICAL CIRCUIT ASSEMBLIES AND STRUCTURAL COMPONENTS INCORPORATING SAME

FIELD

This invention relates to electrical circuit assemblies and to structural components incorporating the same, and in particular to elements of fibre reinforced composite materials in which one or more of the fibres is electrically conducting to pass an electrical current.

BACKGROUND INFORMATION

Modern aircraft typically contain many miles of cabling which passes electric current, for example to supply power to equipment, to carry control signals, or to pass electronic data. Such cabling contributes to the weight of the vehicle and furthermore is time-consuming to install and route. There is therefore a need to provide alternative ways of passing electric currents which also are ideally of low profile configuration. Furthermore, as new technologies are developed for monitoring and control of a vehicle such as an aircraft, so the need to pass signals or power to or from components increases.

WO2005/114781 discloses a conductive loaded resin-based material for forming aircraft structures and avionics. A number of objects made out of the conductive material are described but in these the conductive material is homogenised within the resin. 'Wires' of conductive loaded resin-based material surrounded by an insulating material can be constructed.

US2008/0115954 discloses a wire which is integrated into an airplane composite structure. The wire includes a conductive core surrounded by an isolation layer.

SUMMARY

However, in each of the above proposals the conductor is a parasitic element in the fibre composite as it differs in size and shape and/or composition to the remainder of the composite. This means that the material properties of the composite such as its strength, flexibility etc as well as microscale properties such as bond strength, wetting etc between the resin or other composite matrix material and the fibres may be compromised.

Accordingly, in one aspect, this invention provides an electrical circuit assembly comprising spaced electrical components electrically coupled by two or more electrically conducting paths, each path including an electrically conducting fibre which forms part of a fibre reinforced composite material comprising a plurality of reinforcing fibres and a matrix material, wherein substantially all of said electrically conducting fibres and substantially all of said reinforcing fibres are in at least partial surface bonding contact with said matrix material, whereby said conducting fibres also serve as reinforcing fibres.

In this invention the provision of multiple conducting paths in the composite material uses intrinsic elements and does not substantially alter the material properties of the composite material, save for its electrical conductance. This means that the multiple conducting paths may be provided without requiring extensive testing and redesign of a component to allow for the effect of introducing a foreign or extraneous element as in the earlier documents referred to above. Thus the strength, mass, resonant, etc properties may be substantially unaffected by the presence of the multiple conducting tracks.

In the design of composite components, the adhesion between the reinforcing fibres and the matrix material is critical to the strength of the composite and embodiments of this invention enable the conducting paths to be made of inherently conducting reinforced fibres such as carbon fibres whose adhesive properties relative to the matrix are well known, and the bond strength can be determined to a high degree of accuracy.

In this manner, electric currents providing any one of power, control signals, data etc or a combination thereof can be passed along or through the fibre reinforced composite material. The conducting elements are therefore intrinsic to the composite material, and discretely addressable in contrast to the prior art arrangements referred to above.

The electrically conducting reinforcing fibres may themselves be of an electrically conducting material, such as carbon. Alternatively, each conducting fibre may have an electrically conducting surface. This surface may be an electrically conducting coating provided on the interior of the fibre, where the fibre is hollow.

Additionally or alternatively, the electrically conducting surface may be provided on the exposed surface of the fibre. Preferably the surface is selected to provide suitable interfacial adhesion characteristics.

The electrically conducting reinforcing fibres may be electrically isolated from other like fibres defining a separate path simply by the material of the matrix and/or the intervening fibres, where these are of non-conducting material. Many matrix materials such as polymer resins are good insulators and likewise may fibres have good electrically insulating properties, eg glass, quartz, Kevlar®, aramid etc. Moreover the conducting fibres may be collected with other like fibres into conducting tows that are electrically isolated from other such tows in the structure.

There are various ways in which an electrically conducting coating, core or layer may be deposited on or in the fibre. For example, the electrically conducting coating, core or layer may be deposited at least partially in the vapour phase. Alternatively, the electrically conducting coating, core or layer may be deposited by applying molten metal material to the fibre and allowing said metal material to solidify to create said electrically conducting layer or coating. Another method is to apply the coating, core or layer by means of electroless plating, by electroplating, or a combination of both. For example a first layer or layers may be deposited by electroless plating with a subsequent layer or layers being deposited by electroplating. This allows greater control of the overall plating process.

The coating, core or layer may be selected from any suitable conducting material including amongst which are metals including, but not limited to silver, gold, copper, aluminium, chromium, nickel iron, gallium, indium and tin, and alloys including one or more of the aforesaid, and also conductive polymers, electrolytes and colloids. The fibres may be of any suitable fibre that can be used in the construction of a fibre reinforced composite material including carbon fibres, glass fibres, mineral fibres, ceramic fibres, polymeric fibres, and metal fibres.

In one arrangement the limit assembly includes means for selectively modulating one or more electrical properties of the reinforcing fibres. Thus a first, core, group of fibres may be spaced from a second screen group by a third spacer group of fibres into or from which an electrical property modulating material may be introduced or withdrawn, e.g. to adjust the dielectric constant of the space.

The invention also extends to materials which use hybrid weaves of different fibres. For example there may be a mixture of fibres of different materials, dimensions, hollow or solid to lend the material particular material properties.

The matrix material preferably comprises a suitable material which is electrically insulating. The matrix material may be polymeric, elastomeric, metal, and ceramic or a mixture of these.

The terms "electrically conducting" and "electrically insulating" and the like are relative and intended to be interpreted as meaning that a useful electrical signal is transmitted along a desired signal or power path by one or a collection of said electrically conducting fibres.

The term "metal" is used to include not only pure metals but metal alloys. Also included are semiconductors and semimetals.

The electrical circuit assembly as described above may take many forms according to the particular application to which it is intended. Thus for example, the electrical circuit assembly may include electrical components which each have respective digital input/output terminals for inputting and/or outputting a digital signal, with the assembly providing a plurality of conducting fibres passing digital signals between said digital input/output terminals.

The invention is of course not limited to use with digital electronic components as the circuit assembly can comprise two spaced analogue electrical circuit components, and indeed hybrid arrangements where the assembly includes analogue sensors which transmit or modulate a signal to/from a primarily digital component.

The conducting fibres may simply conduct signals or in another preferred arrangement they form an active sensor. In this arrangement, there is provided a structural component formed of a fibre reinforced plastics material comprising a plurality of fibres and a matrix material, wherein at least some of said fibres are electrically conducting, said component further including electrical monitoring means for monitoring an electrical characteristic such as e.g. electrical continuity of at least some of the or each electrically conducting fibres and thereby providing an indication of the structural health of said structural component.

In this way the arrangement can monitor various physical, chemical, electrical or electro-magnetic influences to which the structural component is exposed.

In another aspect, this invention provides a structural component formed of a composite fibre material and defining multiple electrically conducting paths therein, wherein the composite fibre material comprises a plurality of reinforcing fibres substantially all of which are in at least partial surface contact with a matrix material, wherein said multiple conducting paths are each defined by one or more electrically conductive fibres substantially all of which are in at least partial surface contact with said matrix material, whereby the conducting fibres serve both as reinforcing elements and electrical conductors.

In a further arrangement a tuneable structure includes spaced conducting regions formed of one or more electrically conducting fibres interposed with fibres whose electrical properties can be selectively varied. Thus the fibres may be hollow and an electrically modulating material selectively introduced or withdrawn into or from the hollow fibres.

In another arrangement, the conducting fibres may form part of an active sensor such as an antenna. Here the conducting fibres could pass signals to and/or from simple dipoles or arrays. These dipoles or arrays may be separate or they may comprise suitably configured electrically conducting fibres. In another arrangement, the conducting fibres may be configured to make up a frequency selective structure (FSS). In the latter case, a composite structure in accordance with the invention can be provided to serve e.g. as a radome with electrically conducting tracks spaced so as to be transparent to the wavelength of interest.

In yet another arrangement, the conducting fibres may be arranged so that one or more are used to generate an interrogation signal and one or more of the remaining electrically conducting fibres are used to detect the response to said interrogation signal.

In another aspect, this invention provides a fibre composite material comprising a plurality of fibres in a matrix material, in which one or more of said fibres is electrically conducting to provide discrete electrical conductors electrically isolated from each other, and wherein the outer diameter of said fibres is less than 100 µm.

The invention also extends to a hollow fibre for use as an electrically conducting fibre in a fibre composite material, said fibre having an internal coating, core or layer of electrically conducting material. and an outer diameter of less than 100 µm.

In yet another aspect this invention provides a method of making an electrically conducting fibre, which comprises selecting a hollow fibre having an outer diameter of less than 100 µm, and depositing on the interior thereof a coating, core or layer of metal material.

The metal material may be deposited in a number of different ways, including one or more of electroplating and/or electroless plating, by vapour phase deposition (including chemical vapour deposition or evaporation), by liquid phase deposition, or by contacting the interior of the fibre with molten or liquid material to provide an electrically conducting coating, core or layer. Thus a molte material may solidify leaving a coating, core or layer, whilst other materials may leave a fluid coating or core. Other metals or alloys may remain in the liquid phase (e.g. Galinstan).

BRIEF DESCRIPTION OF THE DRAWINGS

The invention will be better understood by reference to the following description and Examples, reference being made to the accompanying drawings, in which.

DETAILED DESCRIPTION

In the following examples, a hollow fibre is provided with an internal electrically conducting coating, layer or core so that a fibre composite material can be made which has electrically conducting fibres running through it to provide pathways for signals, power etc. In this way, a fibre composite structure can be provided in which the interface between the external fibre and the matrix material is unaffected, with the electrically conducting region being housed fully within the fibres.

Metallisation Techniques

CVD

Gas phase metal deposition methods are considered attractive as the viscosity of the coating materials may be many orders of magnitude lower than for liquid phase methods. This greatly simplifies the infiltration of the active materials into very small components as relatively high flow rates may be achieved at modest pressures. A potential CVD technique based on the reduction of silver pivalate in either hydrogen or oxygen at elevated temperature (250° C.) is described in [Abourida M, Guillon H, Jimenez C, Decams J M, Valet O, Doppelt P, Weiss F, "Process for the deposition by Process for the deposition by CVD of a silver film on a substrate", United States Patent 20070148345].

Liquid Metals

Direct infiltration with liquid metal provides a simple and straightforward approach to creating a metal cored fibre. It is desirable to use a metal with a conveniently low melting point so that both fibres and composites could be treated without risk of damage Electroless Plating A suitable plating technique uses the reduction of a chloroauric acid solution ($HAuCl_4$) by glycerol as described by Takeyasu et al. [Takeyasu N, Tanaka T and Kawata S, "Metal deposition into deep microstructure by electroless plating", *Japanese Journal of Applied Physics,* 44, N0. 35, 2005, pp. 1134-1137.].

The plating process described used the following components:

Plating solution=0.024 M $HAuCl_4$+0.75M NaOH+0.086 M NaCl in deionised (DI) water Reduction agent=0.5% vol. glycerol in DI water Sensitizer=26 mM $SnCl_2$+70 mM trifluoroacetic acid (TFA) in DI water Example 1

Figure 1:
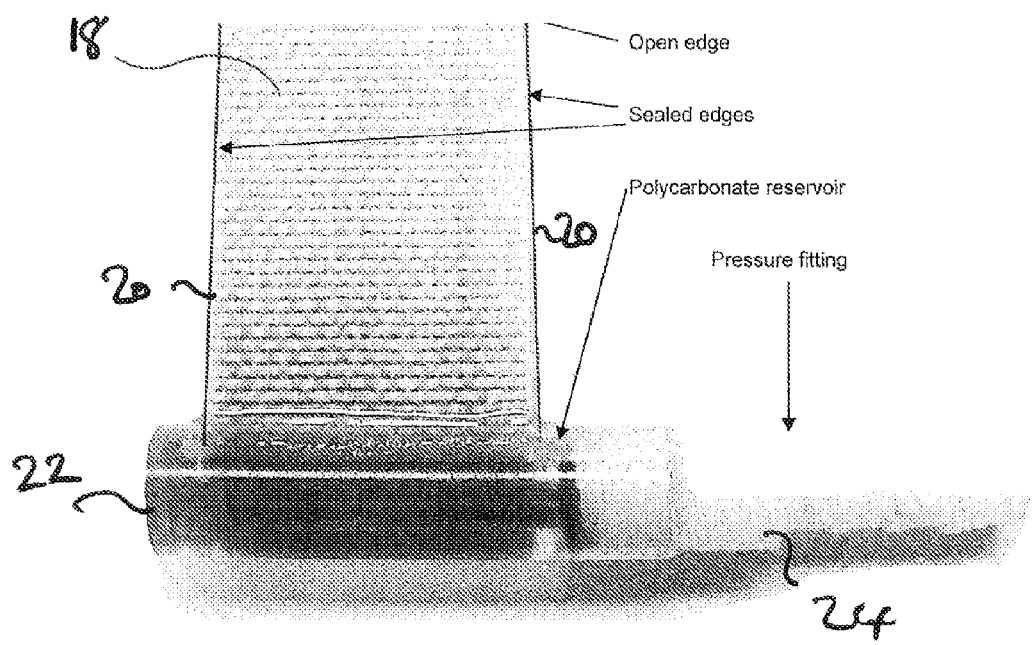
FIG. 1 is a schematic view of an arrangement for infiltrating a composite coupon.

Referring to FIG. 1, short composite coupons 18 of dimensions 30-40 mm long×10-15 mm wide×2-3 mm thick were prepared so that infiltration of full scale fibres could be investigated. The composite was made using a 0°/90° woven fabric and so the long edges 20 of the coupons were sealed to prevent ingress of materials into fibres running in the 90° direction. A polycarbonate reservoir 22 and a pressure fitting 24 were bonded over one of the open ends of the coupon to facilitate the introduction or removal of materials. This configuration allowed materials to be introduced by capillary action or through the use of positive and negative pressure differentials as with the single fibre test specimens.

The composite test specimen was used to investigate the plating behaviour of the gold solution at full-scale. The reservoir was filled with sensitizer and this was blown through using dry nitrogen at 2.5 bar until the open end of the specimen was seen to be wet. Typical filling times at 2.5 bar were of the order 5-10 seconds for a 40 mm long panel. The excess sensitizer was removed from the reservoir by pipette and replaced with DI water which was then blown through until the reservoir was empty. The rinsing process was repeated a second time in an attempt to ensure that any excess sensitizer had been removed. Blowing was continued until bubbles could be seen on the open edge of the panel indicating that most of the remaining fluid had been expelled. Freshly prepared 6× gold/ethylene glycol solution was introduced into the reservoir and blowing was started using 2.5 bar dry nitrogen as before. The reaction was seen to start immediately in the reservoir as the walls turned black in a few seconds. It was thought that this was possibly due to the presence of excess sensitizer as it is difficult to rinse the reservoir thoroughly due to its small size and narrow induction port. Blowing was continued for several minutes and the panel was observed to take on a pink appearance within a short time. After approximately 5 minutes, blowing was discontinued and the reservoir was vented to remove the pressure differential. The reservoir was still filled with excess plating solution as was the composite panel and the specimen was left in this condition for 2 hours to allow any remaining metal to plate out. During this time the pink colouring became progressively stronger. This discoloration was taken as an indication that gold was plating out onto the fibres as thin gold films observed on the pipettes also showed a pink/purple coloration before taking on a metallic appearance.

Example 2

A second test was conducted to investigate a potential method of avoiding contamination of the reservoir by sensitizer. Previous observations have shown that it takes approximately 8 minutes to infiltrate a 100 mm long panel. Sensitizer was introduced from the open end of the composite panel by dipping and 10 minutes was allowed for infiltration. Contamination of the reservoir was avoided as infiltration by capillary action would automatically stop at the far end of the panel inside the reservoir. After filling, the sensitizer was blown out using 2.5 bar nitrogen as before. The reservoir was then filled with DI water and blown through to rinse out the panel. Two rinses were performed as before. The reservoir was filled with plating solution and blown through for ~4 mins. The panel began to discolour from the open end almost immediately with the purple colour progressing to the other end of the panel over ~5 minutes. No discolouration was observed in the residual fluid in the reservoir for the first ~20-30 minutes after filling after which it proceeded to darken at a rate similar to that observed for the pipettes. The panel was left full of plating solution overnight to finish plating. The composite panel was considerably darker than after the first attempt and the reservoir was almost completely free of discolouration and plating suggesting that the revised filling technique had been successful and that the majority of the potential metal had been deposited onto the fibres.

The depleted plating solution was blown out and replaced with fresh solution. The panel was infiltrated and left again for several hours during which the discolouration became progressively darker with the fibres finally appearing black. Close inspection of the open ends of the panel revealed them to be black but with a slight metallic sheen in places suggesting that these had also been coated. A digital volt meter (DVM) was placed across the ends of the panel and a high, but measurable, resistance was registered suggesting that a continuous connection had been formed.

Examples 3, 4 and 5

Three concept demonstrators were fabricated to explore the potential uses of the material. These demonstrators used Ni coated carbon fibres as representative conductive structures as their diameters are of the same order as the glass fibres used in the actual system. The first panel (Example 3) demonstrated the ability to incorporate multiple parallel electrically conducting paths and was used to explore potential connection methods and for electrical tests. Conductive pins were added to the panel by drilling small holes normal to the surface directly over the location of the respective conductive fibre tows defining the conducting paths. Gold plated solder pins were push fitted into the holes to form electrical contacts. Several of the pins were also bonded into the panel using a silver loaded conductive epoxy resin for added robustness.

A second panel (Example 4) was configured to give three parallel electrical paths. These were accessible via embedded connectors on the panel ends. The panel demonstrated the material's ability to carry power using a 9V battery and a LED. A bi-colour (red/green) LED was used to demonstrate the ability to carry multiple power rails.

The second demonstrator was also used to investigate the feasibility of transferring data via the material. The three conducting paths allowed the panel to be configured to carry RS232 compatible serial data streams in both directions. Text and data files were transferred between two laptop computers at rates up to 56 kbit/s.

The signal transmission properties of the conductors were tested by injecting a sine wave signal at one end and monitoring the far end for signs of attenuation or degradation. The test setup used two adjacent tracks on the X plane as signal conductor and return lines, and the output was measured across a 56Ω load.

Figure 2A:
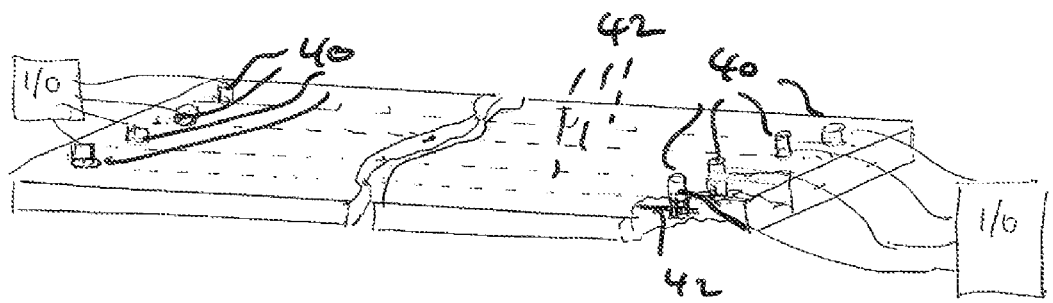
FIGS. 2a to 2c are detailed views of various coupling configurations for use in embodiments of the invention, using ohmic, and contactless capacitative and inductive coupling respectively.
Figure 2B:
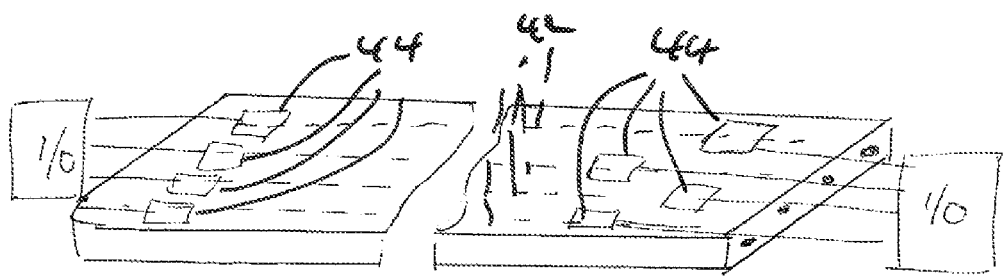
Figure 2C:
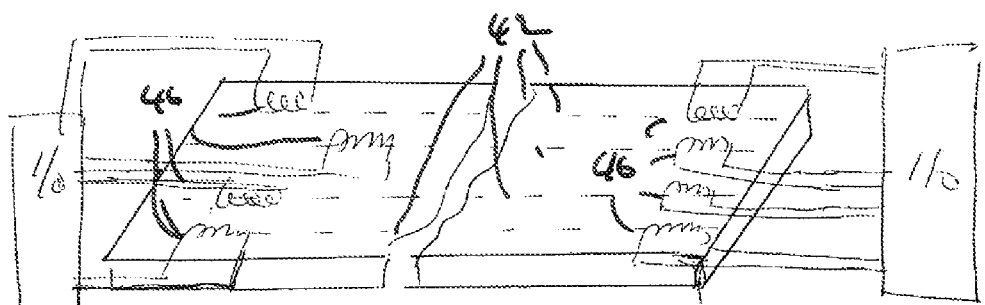

There are a number of different ways in which the conducting elements may be electrically coupled to other circuitry or components. For example as shown in FIG. 2(a) the coupling may be ohmic, for example by providing terminals 40 that are in direct physical contact with the conducting fibres 42 and which extend out of the composite. Alternatively, as shown in FIGS. 2(b) and 2c the coupling may be contactless, by means of a capacitative or inductive coupling elements 44 or 46. An advantage of such an arrangement is that the coupling elements may be re-sited as necessary to reconfigure the electrical circuit if, for example, the original conducting fibre is damaged. The coupling elements could take the form of adhesive pads that can be bonded to the composite material permanently or semi-permanently to provide the required electrical coupling with the underlying conducting fibres.

Figure 3:
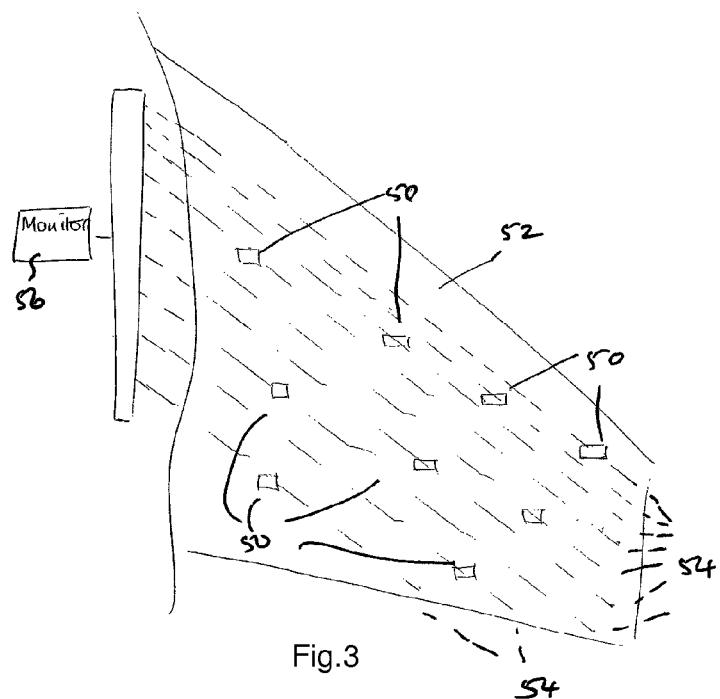
FIG. 3 is a schematic view of the use of an arrangement of this invention for monitoring sensors over an extended surface area of an aircraft.

The circuit so formed may be used to transmit and analogue or digital data signals together, in some instances, with power. For example the data signal may be modulated onto a carrier, and the carrier may be rectified to provide a power source. The circuits so formed may be used for numerous purposes other than conventional power supply or data transfer. Thus for example, as shown in FIG. 3, in aerodynamic studies or aerodynamic control, an array of surface sensors 50 may be provided on an exposed surface of a composite element 52 on an aircraft to detect one or more parameters relating to the structure and/or aerodynamic environment and connected to monitoring equipment 56 by the electrically conducting fibres 54 within the composite element. The use of inductive or capacitive coupling between the sensors 50 and the electrically conducting fibres 52 allows easy reconfiguration and setup.

The provision of an array of conductors on the composite allows redundancy to be built in so that a circuit can be rerouted if required. The conductors could be used to heat the composite material and thus provide de-icing, or to allow the infrared signature of a body to be modified.

Figure 4A:
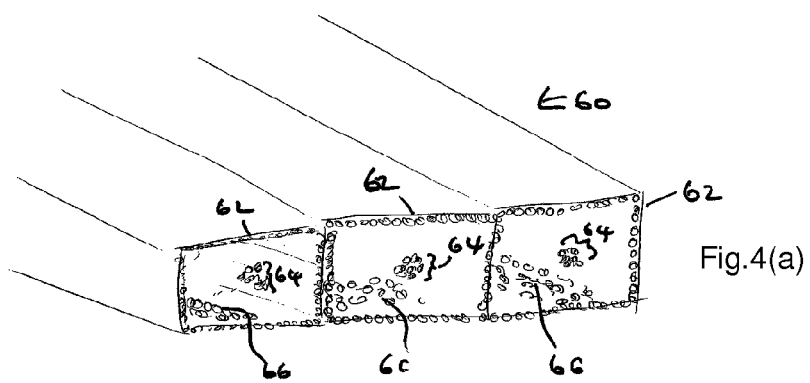
FIG. 4(a) is a schematic view of a composite structure in which a central core conductor is surrounded by a layer of screening fibres spaced from the core by intermediate fibres to allow the transmission characteristics to be varied.
Figure 4B:
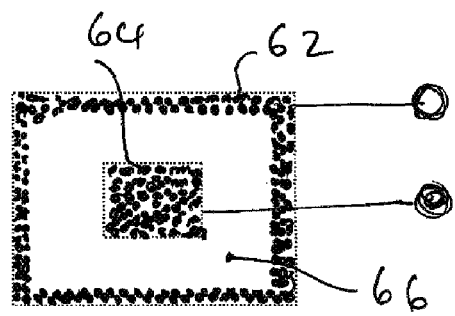
FIG. 4(b) is a detailed end view on one of the screened conductors and a suitable manifold.
Figure 4B:
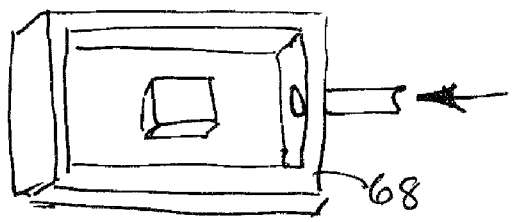

As shown in FIG. 4, a composite structure 60 for transmission or treatment of high-frequency electrical signals, specially designed to allow the electrical characteristics along the signal path to be modified. Thus in cross-section there may is a carbon fibre outer screening or ground conductor skin 62 and a central core conductor 64, with the volume between the central core conductor and the screening filled with fibres 66. These intermediate fibres 66 may be solid or hollow or a mixture of both. Where some of the fibres 66 are hollow, the impedance or capacitance of the conductor may be modified by introducing or withdrawing a suitable fluid material into or from said hollow fibres via a manifold system 68. In this manner materials of different dielectric constant may be selectively introduced into fibres in the space between the core conductor 64 and the outer screens conductor skin 62 so as to vary the impedance and thus the propagation characteristics. Thus a structure may be 'tuned' to adjust the electrical and material properties of a transmission line.

It will be appreciated that the apparatus and methods described herein may be used with other techniques in which a composite fibre structure is configured to perform functions other than purely structural. For example the apparatus and methods herein may be combined with other techniques to make up intelligent structures capable of e.g. shielding and detection of radiation and/or structures capable with a facility the structural health monitoring and/or self repair.

The invention claimed is:

1. An electrical circuit assembly comprising:
spaced electrical components arranged to at least one of send and receive at least one of a control signal and a data signal, said components including digital input/output terminals for inputting/outputting the at least one control signal and data signal;
two or more conducting paths for electrically coupling the components, each path including an electrically conducting fibre for conducting the at least one control signal and data signal, the electrically conducting fibre forming part of a fibre reinforced composite material having a plurality of reinforcing fibres and a matrix material wherein substantially all of said electrically conducting fibres and substantially all of said reinforcing fibres are in at least partial surface bonding contact with said matrix material, whereby said conducting fibres also serve as reinforcing fibres;
means for selectively modulating one or more electrical properties of the reinforcing fibres; and
a first group of electrically conducting fibres defining a conducting core spaced from a second group of electrically conducting fibres defining an electrical screen, by a third group of electrically insulating fibres, at least some of the fibres of the third group being hollow to allow an electrical property modulating material to be selectively introduced into and withdrawn from said fibres of the third group.

2. An electrical circuit assembly according to claim 1, wherein each conducting fibre has an electrically conducting surface.

3. An electrical circuit assembly according to claim 2, wherein each conducting fibre is hollow, and said electrically conducting surface comprises an electrically conducting coating, core or layer on the interior of said fibre.

4. An electrical circuit assembly according to claim 3, wherein said electrically conducting coating, core or layer comprises at least one of an electroless plated layer and an electroplated layer on each fibre.

5. An electrical circuit assembly according to claim 1, wherein each fibre is made of an electrically conducting material.

6. An electrical circuit assembly according to claim 1, comprising:
means for selectively modulating one or more electrical properties of the reinforcing fibres.

7. An electrical circuit assembly according to claim 1, wherein said electrical modulating material is effective to adjust the dielectric constant of the third group of fibres.

8. A structural component incorporating an electrical circuit assembly according to claim 1.

9. A structural component formed according to claim 8, comprising:
   at least one electrical sensor or transducer connected to one or more of said conducting paths.

* * * * *